(12) United States Patent
Kmita et al.

(10) Patent No.: US 8,028,875 B2
(45) Date of Patent: Oct. 4, 2011

(54) VEHICLE ARTICLE CARRIER HAVING SWING IN PLACE CROSS BARS

(75) Inventors: Gerard J. Kmita, Allen Park, MI (US); Jeffrey M. Aftanas, Ortonville, MI (US); Noel V. Ranka, Canton, MI (US); Claude K. Trambley, Macomb, MI (US)

(73) Assignee: JAC Products, Inc., Saline, MI (US)

( * ) Notice: Subject to any disclaimer, the term of this patent is extended or adjusted under 35 U.S.C. 154(b) by 1013 days.

(21) Appl. No.: 11/923,028

(22) Filed: Oct. 24, 2007

(65) Prior Publication Data

US 2008/0257924 A1    Oct. 23, 2008

Related U.S. Application Data

(60) Provisional application No. 60/863,086, filed on Oct. 26, 2006.

(51) Int. Cl.
*B60R 9/045* (2006.01)
(52) U.S. Cl. ......... 224/321; 224/309; 224/325; 224/326
(58) Field of Classification Search .................. 224/309, 224/310, 321, 325, 326
See application file for complete search history.

(56) References Cited

U.S. PATENT DOCUMENTS

| | | | |
|---|---|---|---|
| 3,670,935 A | 6/1972 | Hinkston | |
| 3,838,802 A | 10/1974 | Grycel, III | |
| 4,132,335 A | 1/1979 | Ingram | |
| 4,225,068 A | 9/1980 | Ingram | |
| 4,239,138 A | 12/1980 | Kowalski | |
| 4,295,587 A | 10/1981 | Bott | |
| 4,345,705 A | 8/1982 | Graber | |
| 4,364,500 A * | 12/1982 | Bott | 224/325 |
| 4,406,386 A | 9/1983 | Rasor et al. | |
| 4,416,406 A | 11/1983 | Popeney | |
| 4,433,804 A | 2/1984 | Bott | |
| 4,469,261 A | 9/1984 | Stapleton et al. | |
| 4,473,178 A | 9/1984 | Bott | |
| 4,487,348 A | 12/1984 | Mareydt | |
| 5,004,139 A | 4/1991 | Storm et al. | |
| 5,071,050 A | 12/1991 | Pudney et al. | |
| 5,096,106 A | 3/1992 | Foster et al. | |
| 5,104,018 A | 4/1992 | Dixon et al. | |
| 5,253,792 A | 10/1993 | Foster et al. | |
| 5,273,195 A | 12/1993 | Cucheran | |

(Continued)

FOREIGN PATENT DOCUMENTS

DE    2939672    4/1981

(Continued)

*Primary Examiner* — Justin Larson
*Assistant Examiner* — Adam Waggenspack
(74) *Attorney, Agent, or Firm* — Harness, Dickey & Pierce, P.L.C.

(57) ABSTRACT

A vehicle article carrier system having a pair of swingable cross bars. The cross bars can be placed in a first configuration in which they extend perpendicular to a longitudinal axis of the vehicle. They can easily be released and re-secured in a different configuration wherein they take the form of low profile side rails. A particular advantage is that when the cross bars are moved into their positions perpendicular to a longitudinal axis of the vehicle, each of the cross bars is raised to an elevated position. This provides additional clearance above the outer body surface for articles being supported on the cross bars.

18 Claims, 17 Drawing Sheets

U.S. PATENT DOCUMENTS

| | | | |
|---|---|---|---|
| 5,340,007 A | 8/1994 | Jeuffray et al. | |
| 5,372,287 A | 12/1994 | Deguevara | |
| 5,377,890 A | 1/1995 | Brunner et al. | |
| 5,385,285 A | 1/1995 | Cucheran et al. | |
| 5,395,024 A | 3/1995 | Luchtenberg et al. | |
| 5,411,196 A | 5/1995 | Lee, Jr. et al. | |
| 5,464,140 A | 11/1995 | Hill | |
| 5,470,003 A | 11/1995 | Cucheran | |
| 5,511,709 A * | 4/1996 | Fisch | 224/321 |
| 5,529,231 A | 6/1996 | Burgess | |
| 5,549,229 A | 8/1996 | Grabowski | |
| 5,577,649 A | 11/1996 | Lee, Jr. et al. | |
| 5,588,572 A | 12/1996 | Cronce et al. | |
| 5,624,063 A | 4/1997 | Ireland | |
| 5,758,810 A | 6/1998 | Stapleton | |
| 5,782,391 A | 7/1998 | Cretcher | |
| 5,791,536 A | 8/1998 | Stapleton | |
| 5,826,766 A | 10/1998 | Aftanas | |
| 5,845,829 A | 12/1998 | Stapleton | |
| 5,884,824 A | 3/1999 | Spring, Jr. | |
| 6,015,074 A | 1/2000 | Snavely et al. | |
| 6,102,265 A | 8/2000 | Stapleton | |
| 6,286,739 B1 | 9/2001 | Stapleton | |
| 6,409,063 B1 | 6/2002 | Kmita et al. | |
| 6,415,970 B1 | 7/2002 | Kmita et al. | |
| 6,722,541 B1 | 4/2004 | Aftanas et al. | |
| 6,811,066 B2 | 11/2004 | Aftanas et al. | |
| 6,959,845 B2 | 11/2005 | Aftanas et al. | |
| 7,066,364 B2 | 6/2006 | Kmita et al. | |
| 2005/0017037 A1 * | 1/2005 | Aftanas et al. | 224/321 |
| 2006/0060621 A1 * | 3/2006 | Klinkman et al. | 224/321 |
| 2007/0075108 A1 * | 4/2007 | Stapleton | 224/321 |

FOREIGN PATENT DOCUMENTS

| | | |
|---|---|---|
| DE | 2945950 | 5/1981 |
| DE | 3029586 | 3/1982 |
| DE | 3201409 | 9/1983 |
| DE | 3641745 | 6/1988 |
| DE | 3814799 | 11/1988 |
| FR | 2661378 | 10/1991 |
| FR | 2699475 | 6/1994 |
| FR | 2713568 | 6/1995 |
| GB | 2381252 | 4/2003 |
| WO | WO-9108929 | 6/1991 |

* cited by examiner

VEHICLE ARTICLE CARRIER HAVING SWING IN PLACE CROSS BARS

CROSS-REFERENCE TO RELATED APPLICATION

This application claims priority from U.S. Patent Provisional Application No. 60/863,086 filed Oct. 26, 2006. The disclosure of the above application is incorporated herein by reference.

FIELD

The present disclosure relates to vehicle article carrier systems, and more particularly to a vehicle article carrier system having a pair of cross bars that are able to be positioned to form side rails when not needed, and that can be swung into place to form cross bars when needed to support and secure articles above an outer body surface of a vehicle.

BACKGROUND

Vehicle article carriers are used in a wide variety of applications to support and transport various forms of articles and cargo above an outer body surface of a vehicle. Vehicle article carriers are presently in wide use in connection with automobiles, sport utility vehicles (SUVs), vans and even pick up trucks.

A vehicle article carrier often includes two pairs of support feet positioned laterally across from one another and secured fixedly to the outer body surface of the vehicle. Typically a first side rail (often termed a "support rail") is secured to one pair of support feet, and a second side rail is secured to the other pair of support feet, such that the two side rails extend parallel to one another along a major longitudinal length of the vehicle. Often one or two cross bars are secured to the side rails. One of the cross bars may be fixedly secured so as to be non-movable, while the other is movable. Alternatively, both of the cross bars may include mechanisms that enable them to be moved along the side rails and locked in place at a desired position on the side rails.

With present day vehicle article carrier systems as described above, the cross bars, when in their operative positions extending between the two side rails, can often create a slight amount of wind noise that is perceptible by occupants within the vehicle. Because of this, when the cross bars of the vehicle article carrier system are not needed, some users prefer to remove them entirely from the side rails. As can be appreciated, the task of removing the side rails can be somewhat inconvenient. In addition, the side rails need to be stored once removed from the support feet of the vehicle article carrier system. If the cross bars need to be stored within the vehicle, this takes up otherwise useable cargo capacity within the vehicle. In some instances, tools such as screwdrivers or wrenches may be required to disassemble the cross bars from the side rails.

In view of the foregoing, it would be highly desirable to provide a vehicle article carrier system which includes a pair of cross bars that can be quickly and easily configured as side rails, when there is no need to support articles above the outer surface of the vehicle, and then quickly and easily moved into place to act as cross bars when the need arises to support articles and various types of cargo. It would be further highly desirable if the operation of moving the cross bars into their positions as side rails could be accomplished without the need for any external tools being required for this operation. It would further be highly desirable if such a vehicle article carrier system could enable at least one of the cross bars to be adjustably positioned along the outer body surface of the vehicle, and locked at a desired position. This would enable the cross bars, when they are each in their operative positions, to be positioned to best suit the needs for carrying specific types of articles and cargo. Such a vehicle article carrier system would also eliminate the need to completely remove the cross bars from the remainder of the vehicle article carrier system, instead enabling the cross bars to be moved into positions parallel to one another along the major longitudinal length of the vehicle to thus be positioned to function as side rails.

SUMMARY

The present disclosure relates to a vehicle article carrier system having a pair of swingable cross bars that can be moved into positions generally perpendicular to a major longitudinal length of a motor vehicle on which the vehicle article carrier system is installed, and also secured in positions to act as side rails that extend parallel to a major longitudinal axis of the motor vehicle.

In one implementation a first support foot and a second support foot form a first pair of support feet that are secured on the outer body surface of the vehicle diagonally to one another, while a third support foot and a fourth support foot form a second support foot pair that are also secured to the outer body surface diagonally to one another. The first support foot includes a first cross bar pivotally supported therefrom by a pivot mechanism, and the second support foot has secured to it a second cross bar via a pivot mechanism. In one implementation the pivot mechanisms used with the first and second support feet are identical in construction. In this embodiment, the first cross bar includes a locking mechanism at its free end, while the second cross bar similarly includes a locking mechanism at its free end. The third support foot includes two cross bar receiving areas that enable the free ends of either of the cross bars to be secured to the third support foot. Similarly, the fourth support foot includes two cross bar receiving areas that enable the free ends of each of the cross bars to be secured to it as well.

The cross bars of the vehicle article carrier system can be placed in an operative position extending laterally across the outer body surface of the vehicle by pivoting each of the cross bars about its pivotally secured end portion, and securing their free ends to the third and fourth support feet, respectively. In this configuration the cross bars are able to support articles above the outer body surface of the vehicle. When the cross bars are not needed for use, the locking mechanism at each free end of each cross bar can be unlocked, thus enabling each of the cross bars to be detached from the third and fourth support feet. For example, the first cross bar can then be swung about its pivotally mounted end into position as a side rail, with its free end secured to one of the cross bar receiving areas of the fourth support foot. In a like manner, the free end of the second cross bar can be detached from the fourth support foot and swung about its pivotally mounted end into position as a side rail, with its free end being secured at one of the cross bar receiving areas of the third support foot. This places the two cross bars in position parallel to one another to function as side rails. Positioning the cross bars as side rails can reduce or eliminate any wind noise that might be caused by the cross bars in their operative positions extending laterally across the outer body surface. A particularly helpful feature is that when the cross bars are moved into their non-operative position (i.e., generally parallel to one another and parallel to the major longitudinal length of the vehicle), the cross bars also drop elevationally slightly, thus presenting a low profile appearance. The low profile appearance of the cross bars, when positioned in their non-operative configuration as side rails, also provides an aesthetically pleasing appearance. Also advantageously, when the cross bars are swung into their operative position to extend laterally across the outer body surface of the vehicle, the pivot mechanisms associated with the first and second support feet cause the cross bars to be lifted by a predetermined degree above the outer body surface of the vehicle. This provides an additional degree of clearance that helps to prevent articles being supported on the cross bars from contacting the outer body surface of the vehicle.

In one embodiment, the second and fourth support feet are secured to tracks supported on the outer body surface of the vehicle. The second and fourth support feet are movable along the tracks to thus enable the spacing between the cross bars to be adjusted when the cross bars are in their operative positions. In this implementation the second and fourth support feet each include a separate locking mechanism that enables each to be secured at a desired position along its respective support track.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 11A is a perspective view of a T-shaped locking member used to assist in locking the second end support at a desired position along its associated track;

DETAILED DESCRIPTION

The following description is merely exemplary in nature and is not intended to limit the present disclosure, its application or uses.

Figure 1:
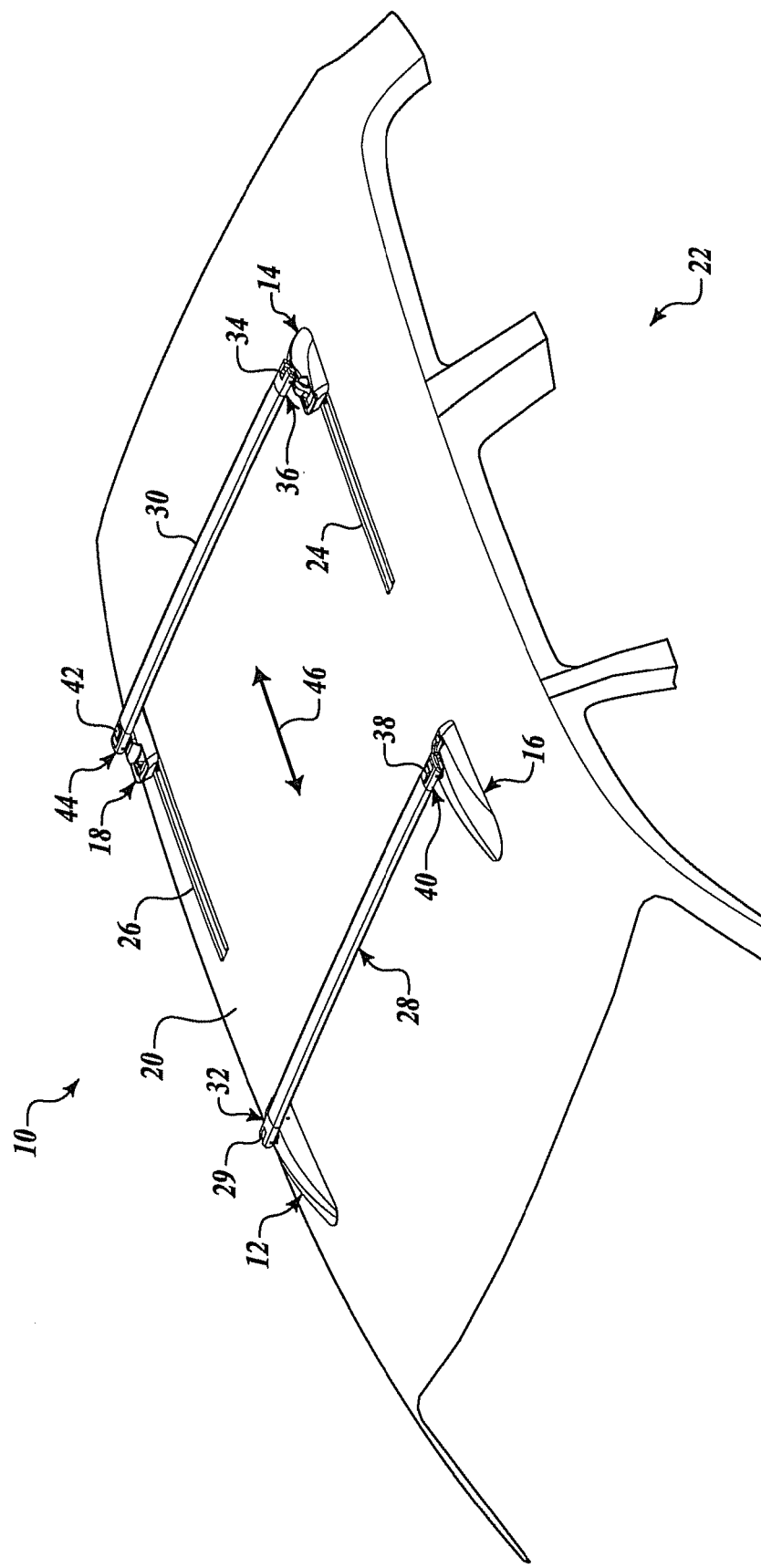
FIG. 1 is a perspective view of one embodiment of a vehicle article carrier system in accordance with the present disclosure, with the system being disposed on a roof portion of a motor vehicle, and with a pair of cross bars of the system in their operative positions extending perpendicular to the longitudinal axis of the vehicle.
Figure 2:
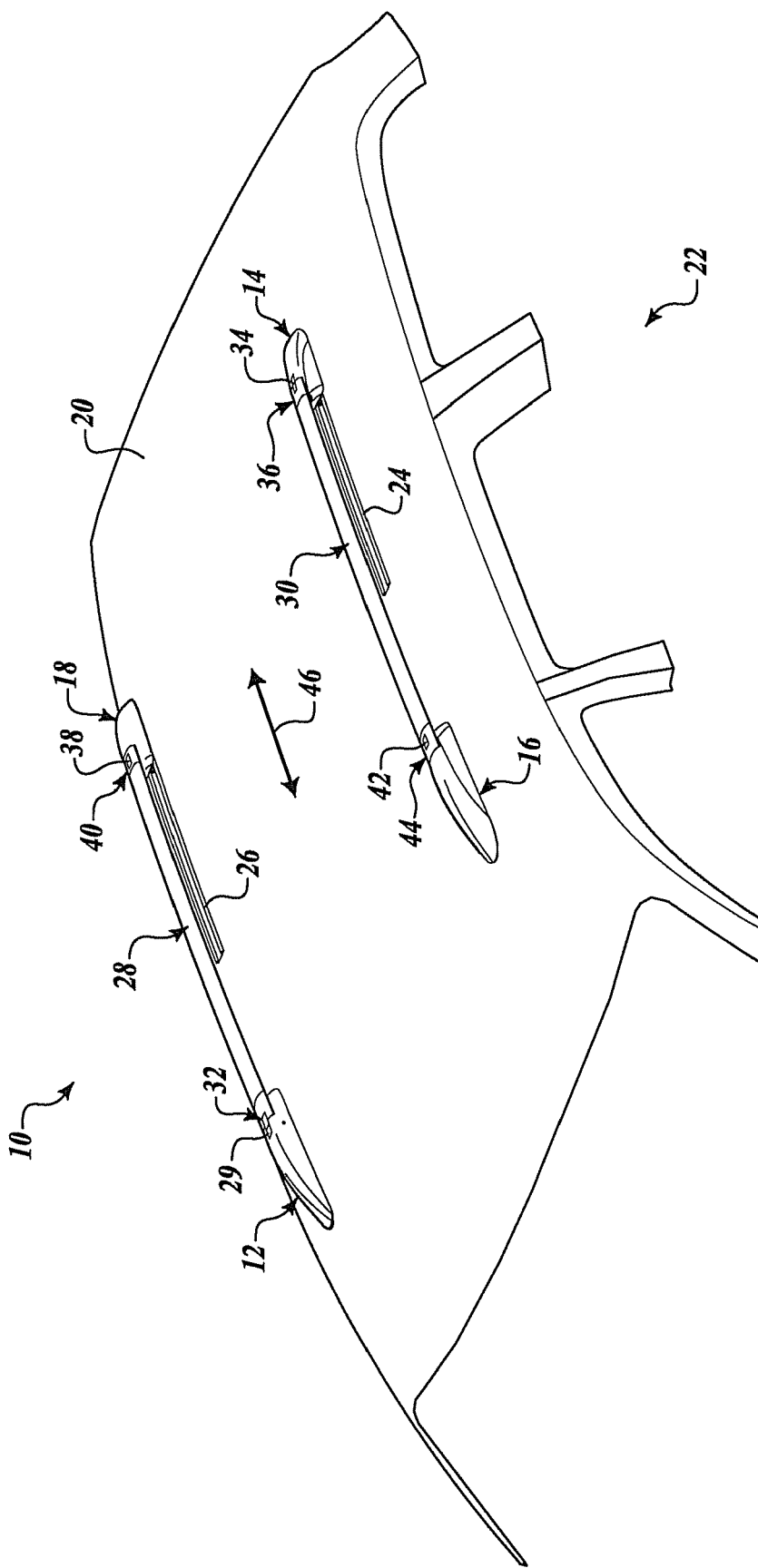
FIG. 2 illustrates the system of FIG. 1 with the cross bars positioned in their non-operative positions as side rails parallel to the longitudinal axis of the vehicle.
Figure 3:
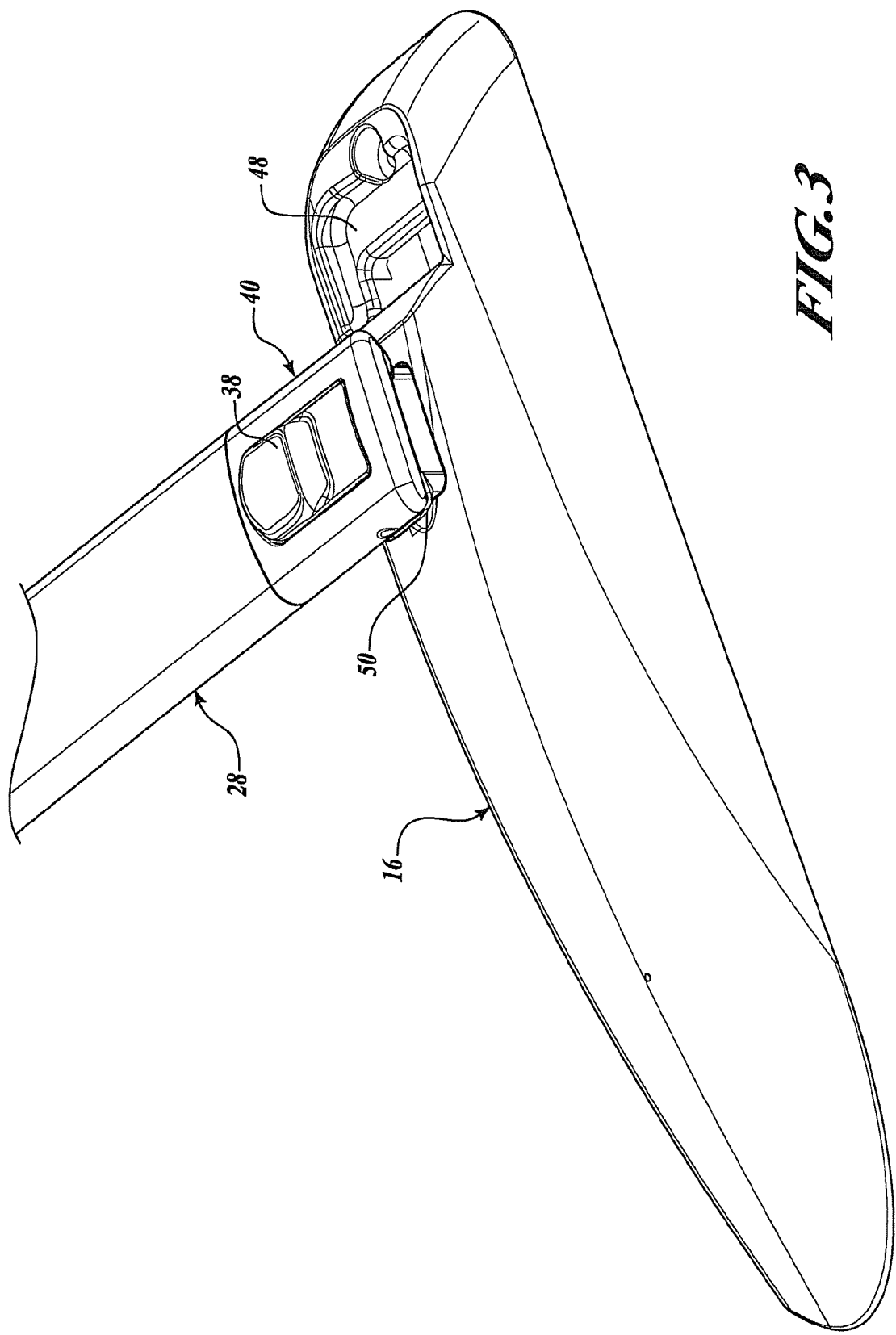
FIG. 3 is an enlarged perspective view of a third one of the support feet of the system.

Referring to FIGS. 1 and 2, a vehicle article carrier system 10 in accordance with one embodiment of the present disclosure is illustrated. In this embodiment the system 10 includes first and second support feet 12 and 14 that form a first pair of support feet, and third and fourth support feet 16 and 18, respectively, that form a second pair of support feet. Support feet 12 and 16 are fixedly secured to an outer body surface 20 of a motor vehicle 22. In this example the system 10 is mounted on a roof portion of the vehicle 22.

The second and fourth support feet 14 and 18, respectively, in this example, are movably secured to tracks 24 and 26, respectively. The tracks 24 and 26 are recessed within the outer body surface 20 so as to rest generally flush with the outer body surface 20. Thus, support feet 14 and 18 can be moved slidably along the tracks 24 and 26 and positioned as needed.

Pivotally secured to support foot 12 is a first cross bar 28. A second cross bar 30 is pivotally secured to the second support foot 14. A pivot mechanism 29 associated with an end support 32 at a first end of cross bar 28 enables pivoting (i.e., swinging) movement of the cross bar 28 about end support 32. Similarly, a pivot mechanism 34 operably associated with an end support 36 of cross bar 30 and with support foot 14 enables pivoting motion of cross bar 30 about the end support 36. Cross bar 28 includes a locking mechanism 38 at an end support 40, which can be viewed as its "free end". Cross bar 30 similarly includes a locking mechanism 42 at end support 44, which can be viewed at its free end.

The cross bars 28 and 30 are shown in their operative positions in FIG. 1 and in their non-operative positions in FIG. 2. In their operative positions (FIG. 1), the cross bars 28 and 30 extend laterally across the outer body surface 20 generally perpendicular to the major longitudinal axis, denoted by arrow 46 in FIG. 1, of the vehicle 22. In their non-operative positions, the cross bars 28 and 30 function as conventional side rails that are positioned generally parallel to one another and generally parallel to the longitudinal axis 46 of the vehicle 22. As will be explained further in the following paragraphs, a significant advantage of the system 10 is that when the cross bars 28 and 30 are moved into their operative positions, as shown in FIG. 1, their respective pivot mechanisms 30 and 34 cause them to be lifted slightly to a higher elevation above the outer body surface 20. This provides additional clearance for articles that are being supported on the cross bars 28 and 30 to reduce the risk of the articles contacting the outer body surface 20. When the cross bars 28 and 30 are not needed for use, pivoting them into their non-operative positions, where they can function as side rails, also causes them to be lowered slightly relative to the outer body surface 20. This is advantageous because it enables the cross bars 28 and 30 to assume a lower profile relative to the outer body surface 20, and thus reduce the possibility of any wind noise being generated by the cross bars 28, 30. The low profile of the cross bars 28 and 30 in the position of FIG. 2 also provides an aesthetically pleasing appearance.

Referring to FIGS. 3-6, the support foot 16 can be seen in greater detail to include a first cross bar receiving area 48 and a second cross bar receiving area 50. With specific reference to FIG. 4, the first cross bar receiving area 48 forms a pocket 49 having an undercut 52 that is able to engage with locking mechanism 42 of the second cross bar 30 when the second cross bar 30 is configured as a side rail (as shown in FIG. 2). Support foot 16 further includes a recessed area 54 within which a protruding portion 55 of the end support 44 can rest when the cross bar 30 is positioned on the support foot 16.

Figure 4:
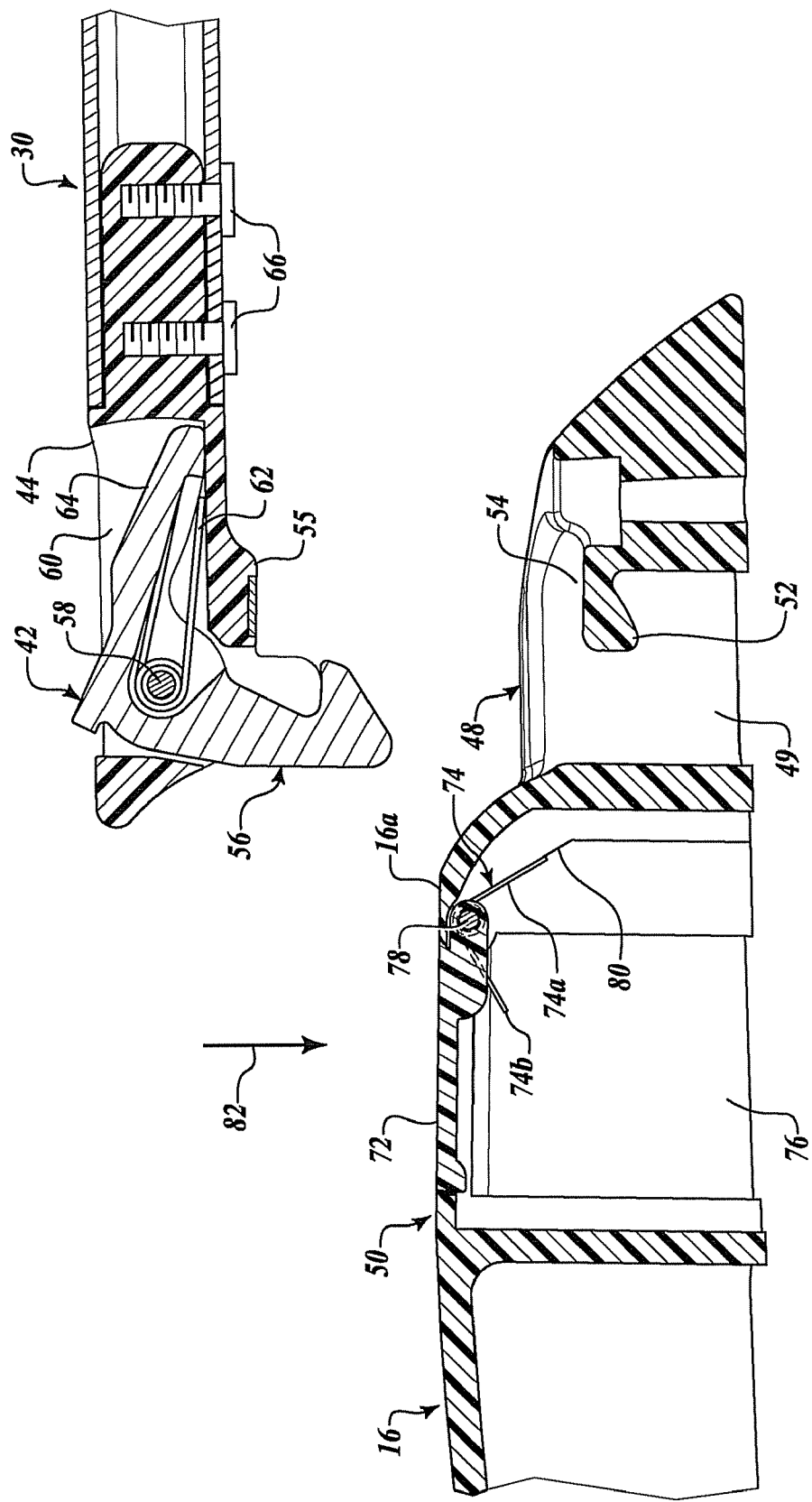
FIG. 4 is a side cross sectional view of the support foot shown in FIG. 3 but with an end support of a second cross bar of the system about to be secured thereto.
Figure 5:
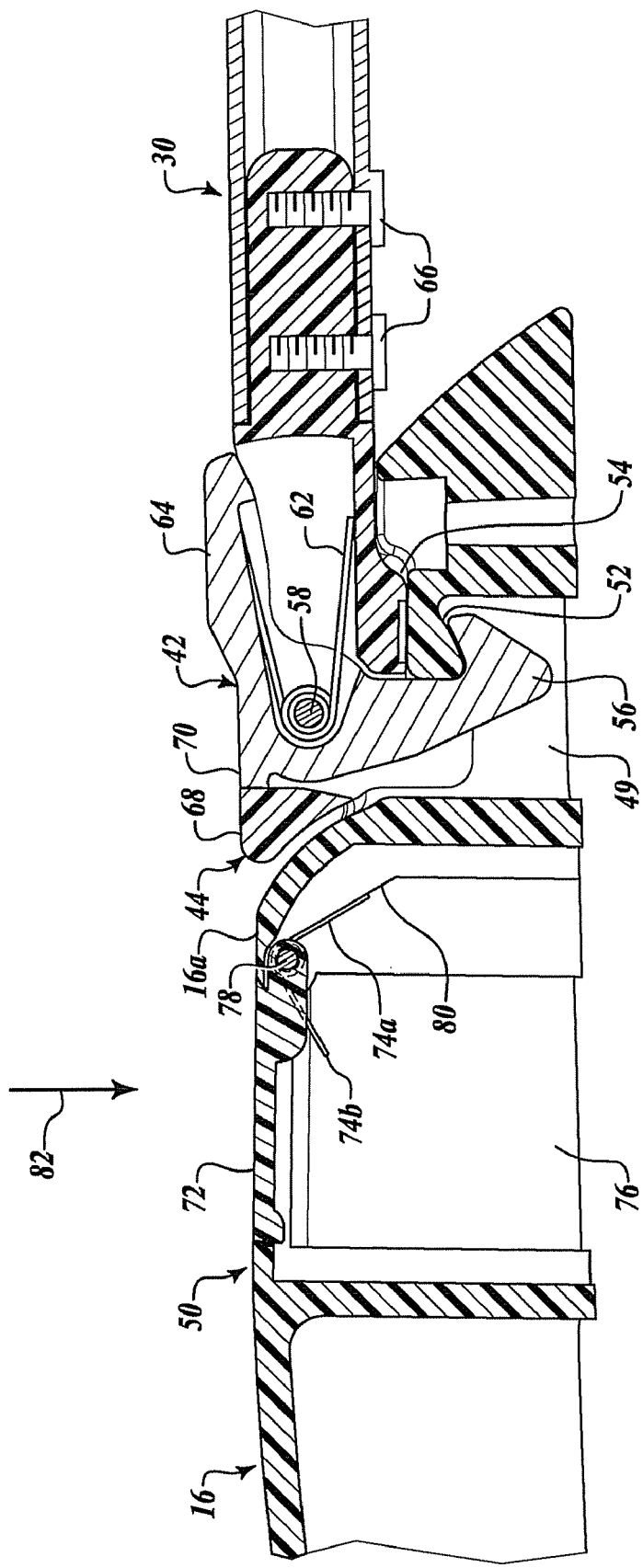
FIG. 5 is a side view of the support foot of FIG. 4 but with the end support of FIG. 4 removably secured thereto.
Figure 6:
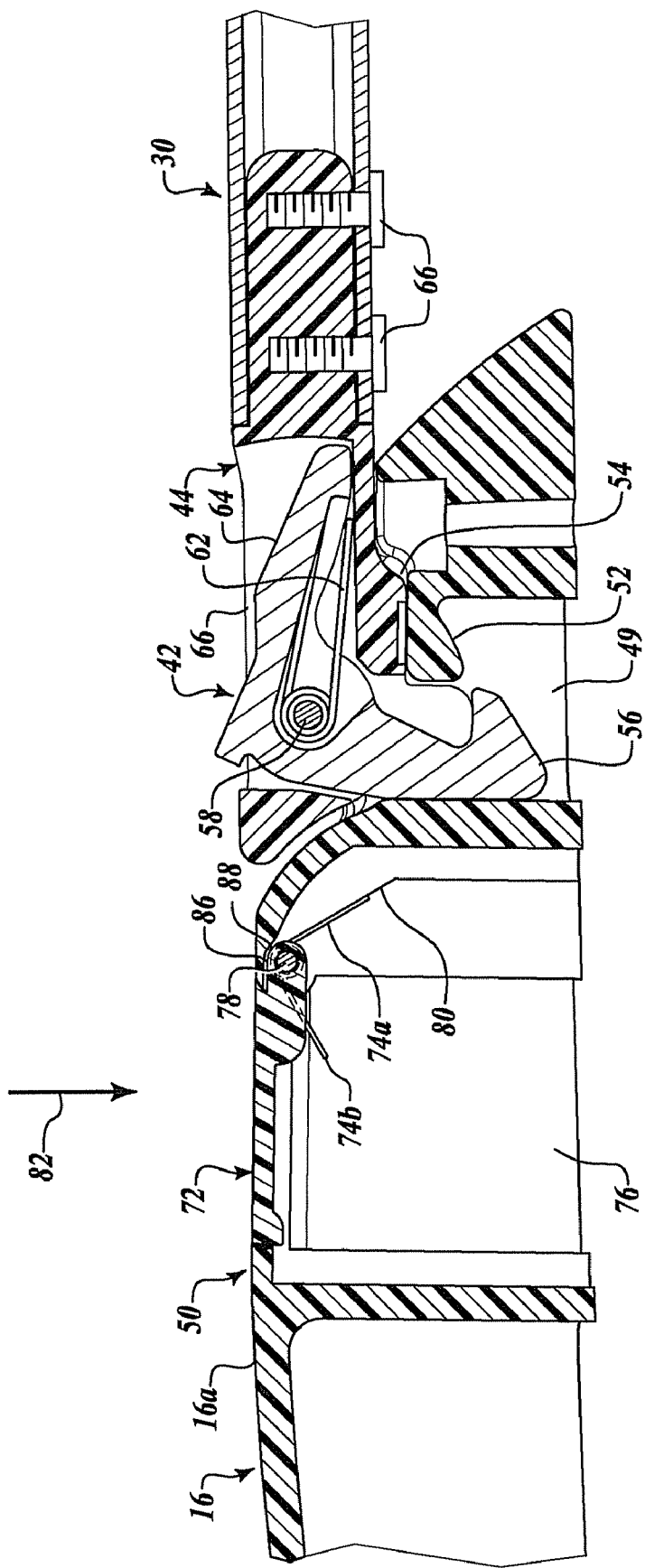
FIG. 6 is a side view of the assembly shown in FIG. 5 but with a locking member pivoted into an unlocked position that enables the end support to be lifted off of the support foot.
Figure 7:
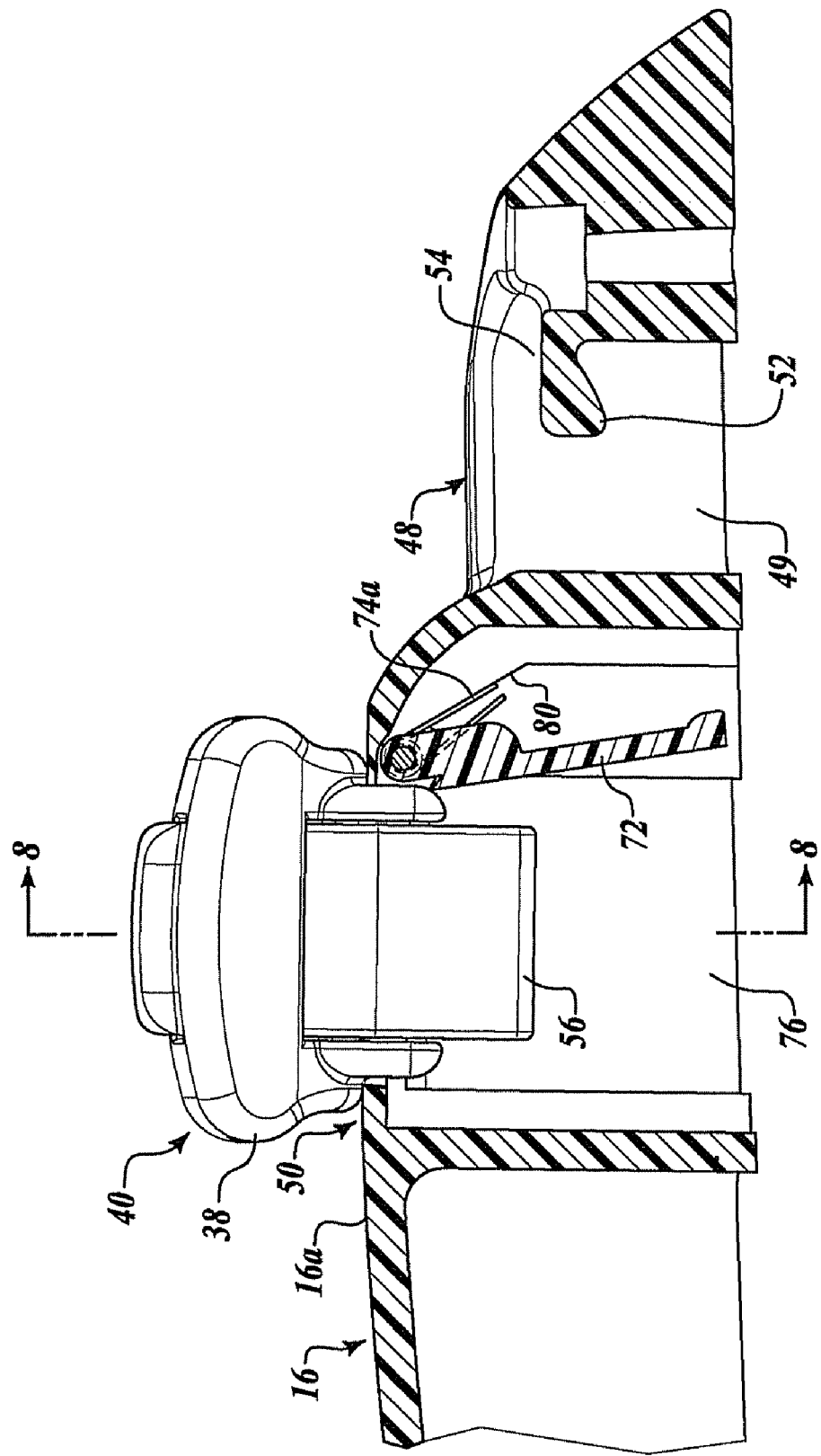
FIG. 7 is a partial cross sectional end view of an end of the first cross bar removably attached to the third support foot.

With further reference to FIGS. 5, 6 and 7, the end support 44 includes a pivotally mounted locking member 56 that is supported by a pivot pin 58 from within a recess 60. A torsion spring 62 positioned around a portion of the pivot pin 58 biases the locking member 56 into the position shown in FIG. 5. An end portion 64 of the locking member 56 can be depressed with a finger of the user and moved into the position shown in FIGS. 4 and 6. As the end support 44 is lowered into the cross bar receiving area 48, portion 55 sits within the recess 54. Releasing of the locking member 56 by the user causes the torsion spring 62 to urge the locking member 56 into the position shown in FIG. 5 where it is engaged with the undercut 52 within cross bar receiving area 48. In this manner, the end support 44 of the second cross bar 30 can be quickly and easily secured to and detached from support foot 16. When secured to the support foot 16, the cross bar 30 forms a substantially co-planar contour with an upper surface 16*a* (FIG. 5) of the support foot 16. The end support 44 may be secured to the cross bar 30 by conventional threaded fasteners 66 or any other suitable means.

With brief reference to FIG. 5, a shoulder 68 formed within the recess 60 enables a projecting portion 70 of the locking member 56 to be stopped at a predetermined point of rotational movement once the user releases the portion 64. This maintains portion 64 at a slightly elevated level relative to the cross bar 30, which also enables the user to quickly locate portion 64 when the cross bar 30 needs to be either secured to or released from one of the support feet 16 or 18.

Figure 8:
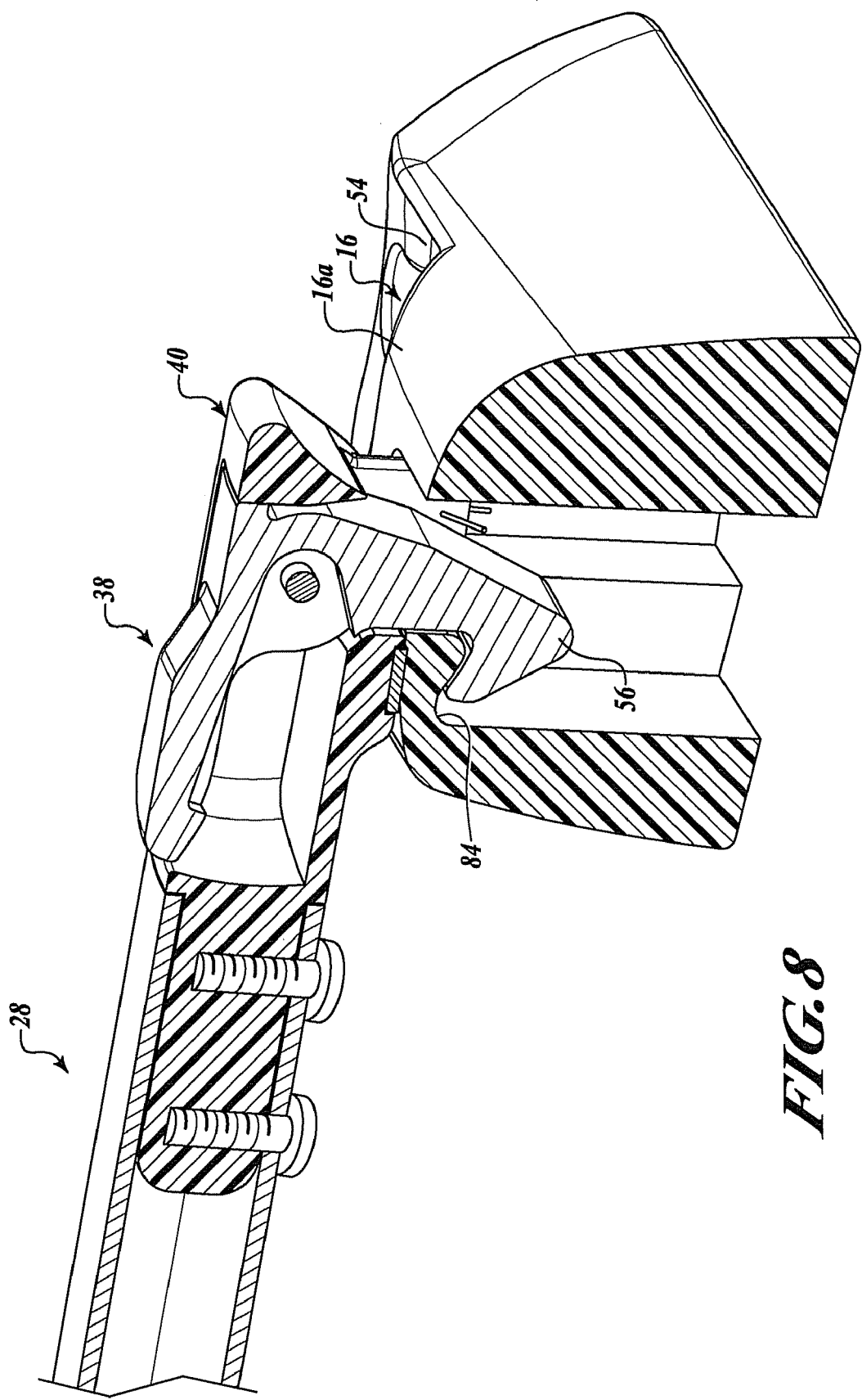
FIG. 8 is a partial cross sectional view of the assembly of FIG. 7 taken along section line 8-8 in FIG. 7, illustrating the engagement of the locking member of the end support of the first cross bar to the third support foot.
Figure 9:
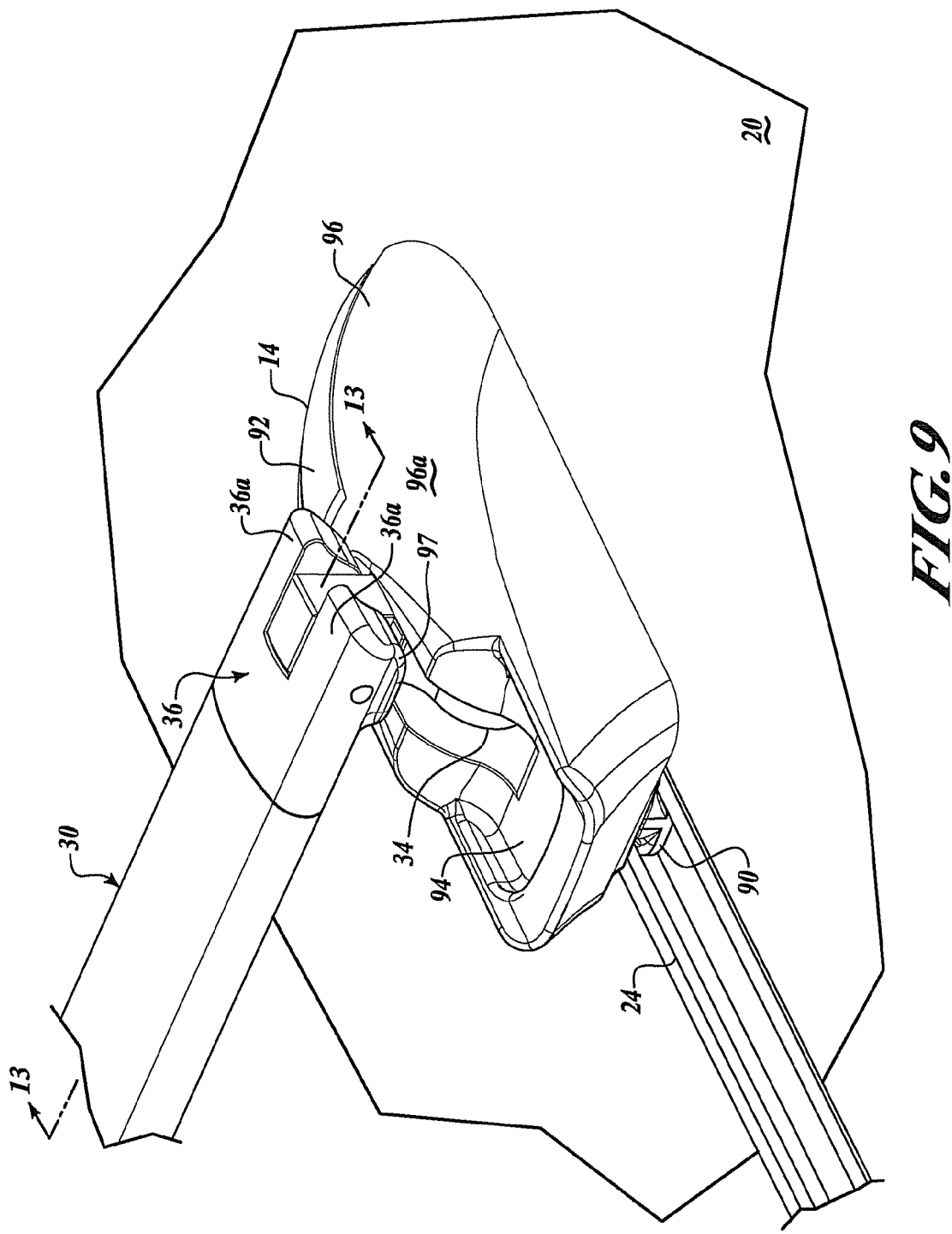
FIG. 9 is an enlarged, perspective view of the second support foot with a portion of the second cross bar pivotally coupled thereto, and illustrating the coupling of the second support foot to a track that is recess mounted in the outer body surface of the roof of the vehicle, with the second cross bar in its operative position.

Referring further to FIGS. 4, 7 and 8, support foot 16 can be seen to include a door 72 biased by a torsion spring 74 that is positioned over the second cross bar receiving area 50. The second cross bar receiving area 50 generally includes a recess 76 for receiving locking mechanism 38 of the first cross bar 28 when the first cross bar is positioned as shown in FIG. 1. The door 72 is mounted on a pivot pin 78, with the torsion spring 74 positioned over the pivot pin 78. One leg 74*a* of the torsion spring 72 abuts a wall portion 80 within the recess 76, while the opposite leg 74*b* abuts structure (not shown) of the door 72. Thus, the torsion spring 74 operates to hold the door 72 in the position shown in FIG. 4, unless a downwardly directed force in accordance with arrow 82 in FIG. 4 is applied to the door 72. In such event, as illustrated in FIGS. 7 and 8, the locking member 56 forces the door 72 into an open position against the biasing force of the torsion spring 74. In this regard it will be appreciated that the locking mechanism 38 associated with end support 40 is identical in construction to the locking mechanism 42 associated with end support 44 described hereinbefore. As such, common reference numerals will be used to describe common components of locking mechanisms 38 and 42.

With continuing reference to FIGS. 7 and 8, the locking member 56 of locking mechanism 38 catches within an undercut 84 formed within the area 76 when the first cross bar 28 is secured to the support foot 16. As can be seen in FIGS. 7 and 8, this also places the first cross bar 28 in a position that is elevated in comparison to the position that the cross bar 28 assumes when it is secured to support foot 18. The additional elevation provides clearance above the outer body surface 20 that further reduces the chance of a portion of the article being supported on the cross bar 28 from contacting the outer body surface 20. When the locking member 56 is urged into its unlocked position and the end support 40 is lifted away from support foot 16, the biasing force provided by the torsion spring 74 urges the door 72 into its closed position as shown in FIG. 6. A body portion 86 of the door 72 contacts an undersurface 88 of the support foot 16 to prevent the door 72 from moving above a point of being flush with the outer surface 16*a* of support foot 16. Thus, it will be appreciated that support foot 16 forms two functions: securing of end support 44 of the second cross bar 30 when the second cross bar 30 is positioned as a side rail (FIG. 2), as well as enabling attachment of end support 40 of the first cross bar 28 when the first cross bar 28 is moved into its operative position (FIG. 1).

Referring now to FIGS. 9-13, the construction of support foot 14 will be described in detail. Support foot 14 is slidably positioned on track 24 and retained within the track 24 by a T-shaped structure 90 dimensioned to slide within the track 24. A pair of notches or cutouts may be formed in upper wall portions of the track 24 at a predetermined location along the track, such as at the extreme forward end of the track 24 (FIG. 1), to enable the support foot 14 to be lifted out of the track 24 if needed. Otherwise, the T-shaped structure 90 prevents removal of the support foot 14 once it is installed in the track 24. The upper surface of the track 24 is preferably approximately flush with the outer body surface 28, or just slightly raised above the outer body surface 20, such that support foot 16 may slide without contacting the outer body surface 20. The support foot 14 includes an actuating lever 92, pivot mechanism 34, and a recessed area 94 formed in a housing 96 thereof. When the cross bar 30 is pivoted into the position shown in FIG. 2, portion 97 of the end support 36 lies within recessed area 94, thus enabling an upper surface of the end support 36 to be generally flush with an uppermost surface 96*a* of the housing 96, to present the appearance of a low profile side rail. However, when cross bar 30 is pivoted into the position shown in FIG. 9, the cross bar 30 is raised above the uppermost surface 96*a* of the housing 96, thus providing extra clearance above the outer body surface 20 to prevent articles from contacting the outer body surface 20.

Figure 10:
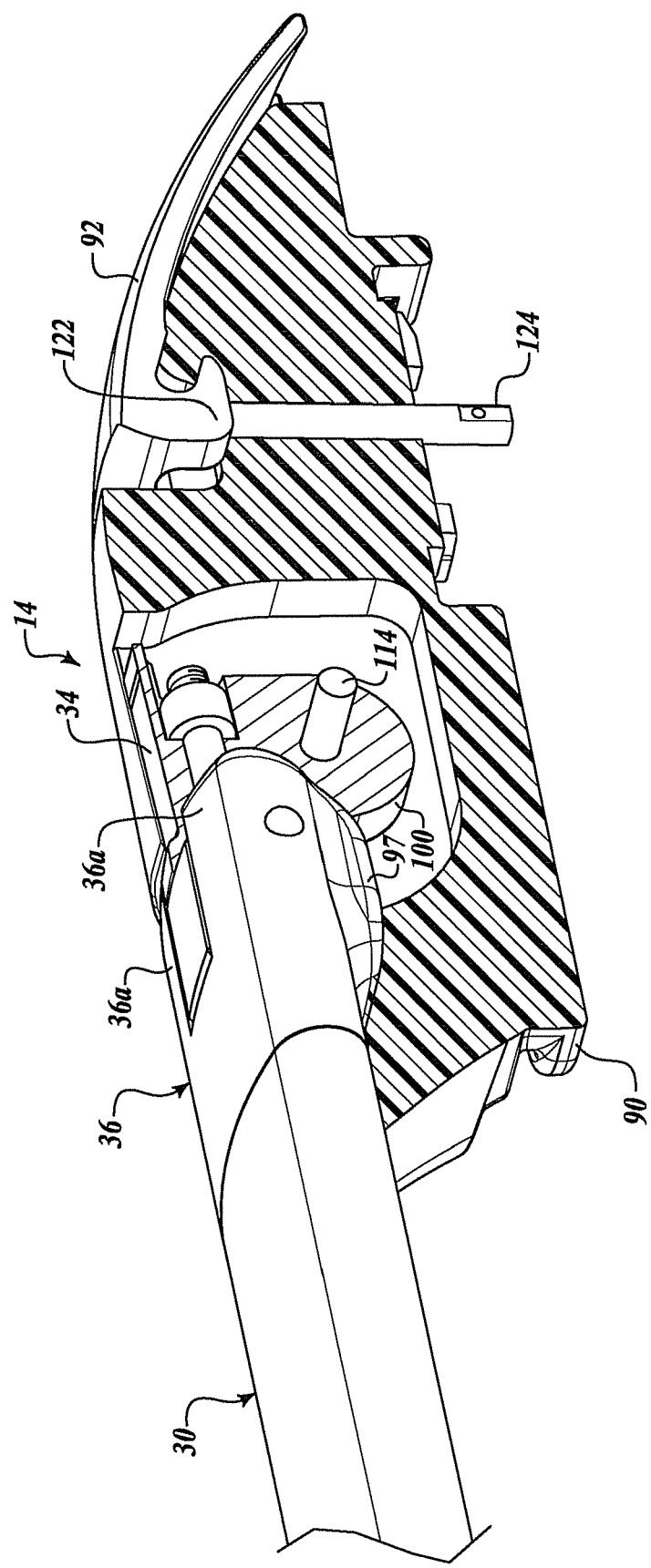
FIG. 10 is a partial cross sectional view of the second support foot with the second cross bar in its non-operative position as a side rail.
Figure 11:
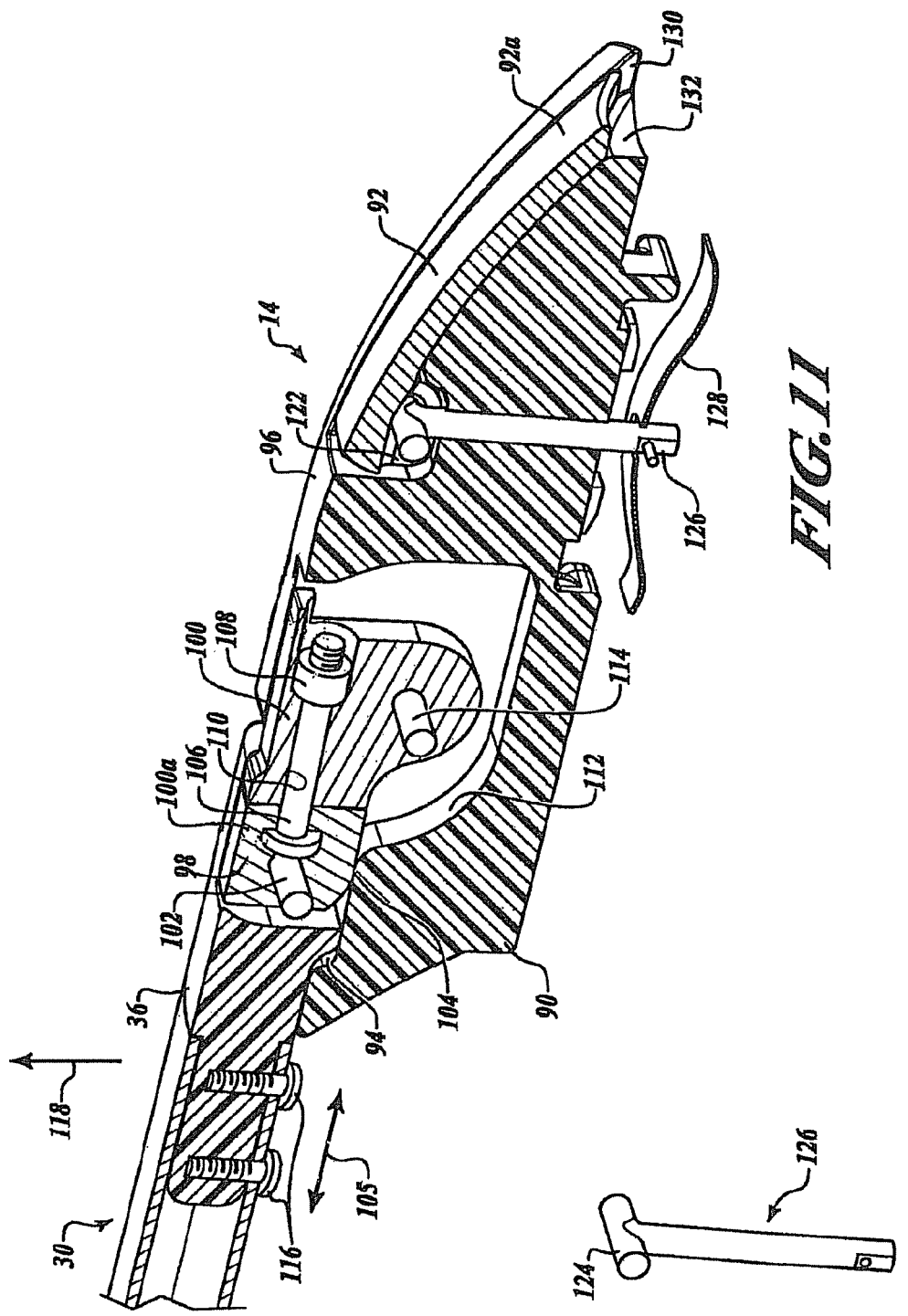
FIG. 11 is a cross sectional view of the assembly of FIG. 10 further illustrating the construction of the pivot mechanism disposed within the second support foot.

Referring to FIGS. 10-13, the construction of the pivot mechanism 34 of support foot 14 is shown in greater detail. In FIGS. 10 and 11, the pivot mechanism 34 includes a coupling member 98 and a pivot block 100. The coupling member 98 is pivotally mounted via a pivot pin 102 within the end support 36 of the cross bar 30. The pivot pin 102 is positioned within an opening 104 that provides a small degree of longitudinal play along the longitudinal axis of the cross bar 30 as defined by arrow 105 in FIG. 11. The coupling member 98 includes a threaded shaft 106 which may be insert molded or otherwise attached to the coupling member 98. Threaded shaft 106 is retained by a threaded nut 108 that extends within a recess 110 in the pivot block 100. The threaded shaft 106 extends through a bore 110 in the pivot block 100. The pivot block 100 and coupling member 98 rest within a recess 112 formed in the housing 96. The pivot block 100 is pivotally mounted via a pivot pin 114 to the housing 96. In FIG. 11, the cross bar 30 is shown secured to the end support 36 by threaded fasteners 116, but could just as easily be secured by any other suitable means.

Figure 12:
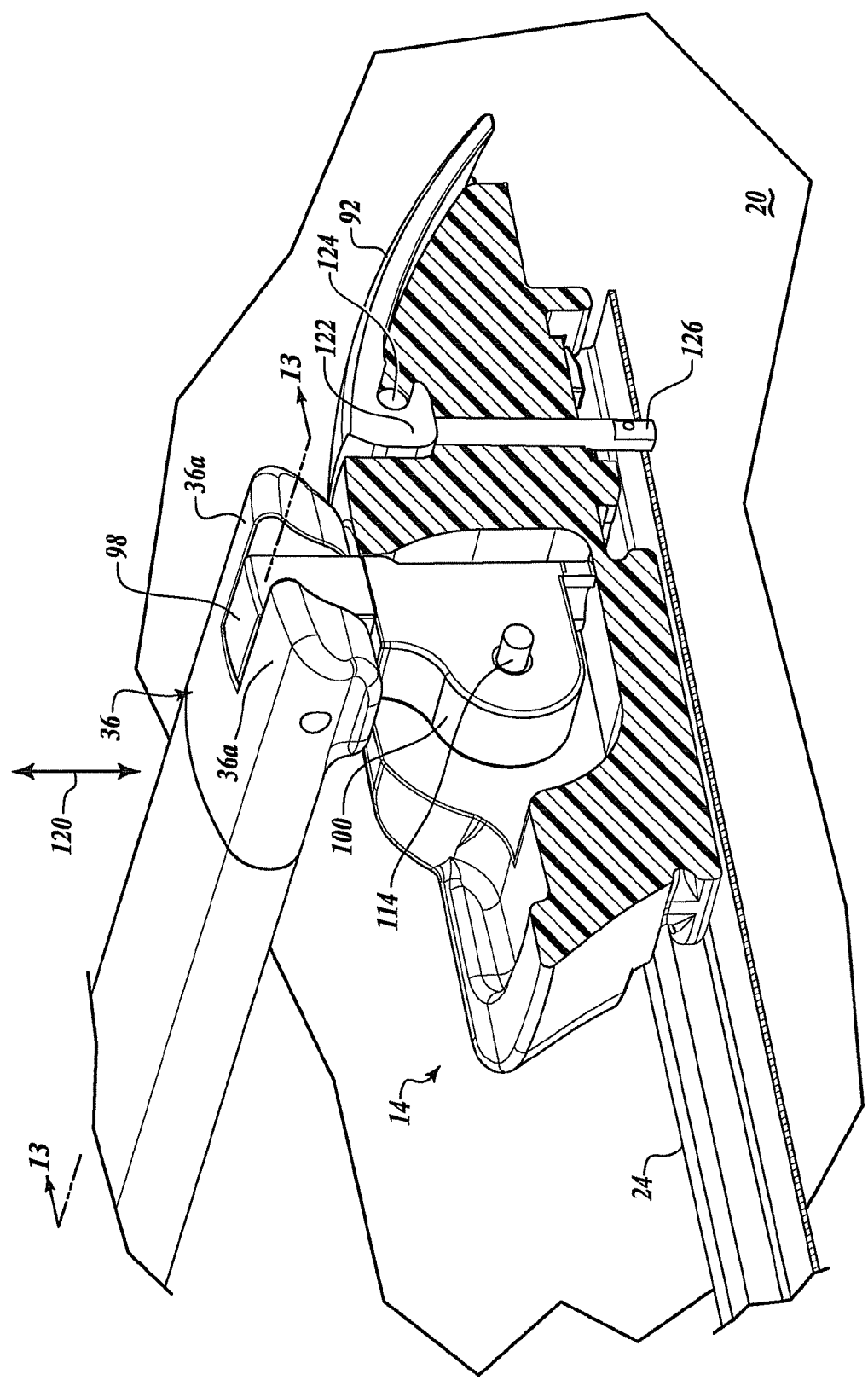
FIG. 12 is a perspective, partial cross sectional view of the second support foot with the second cross bar pivoted into its operative position.
Figure 13:
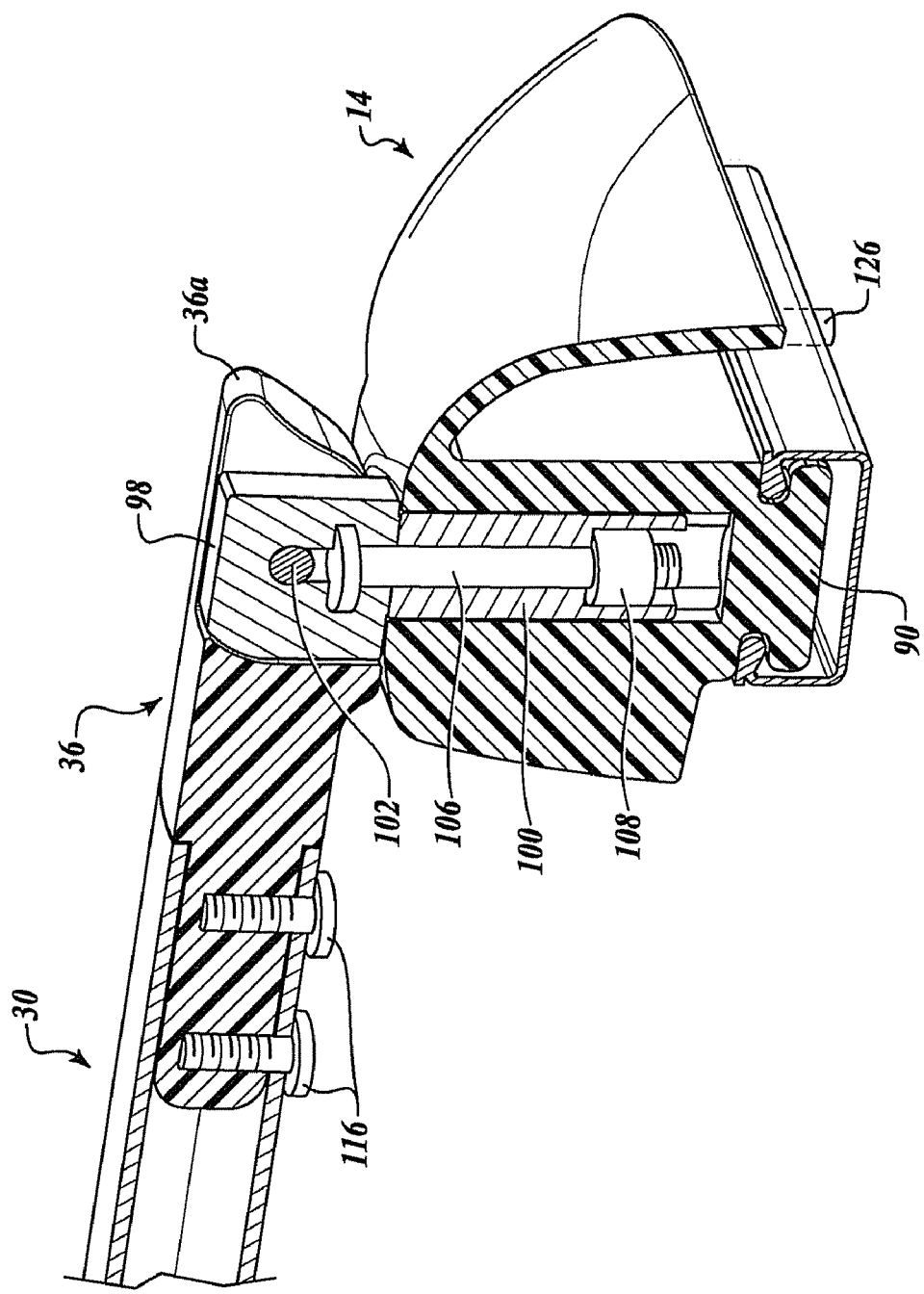
FIG. 13 is a cross sectional view of the cross bar of FIG. 12 in accordance with section line 13-13 in FIG. 12.
Figure 14:
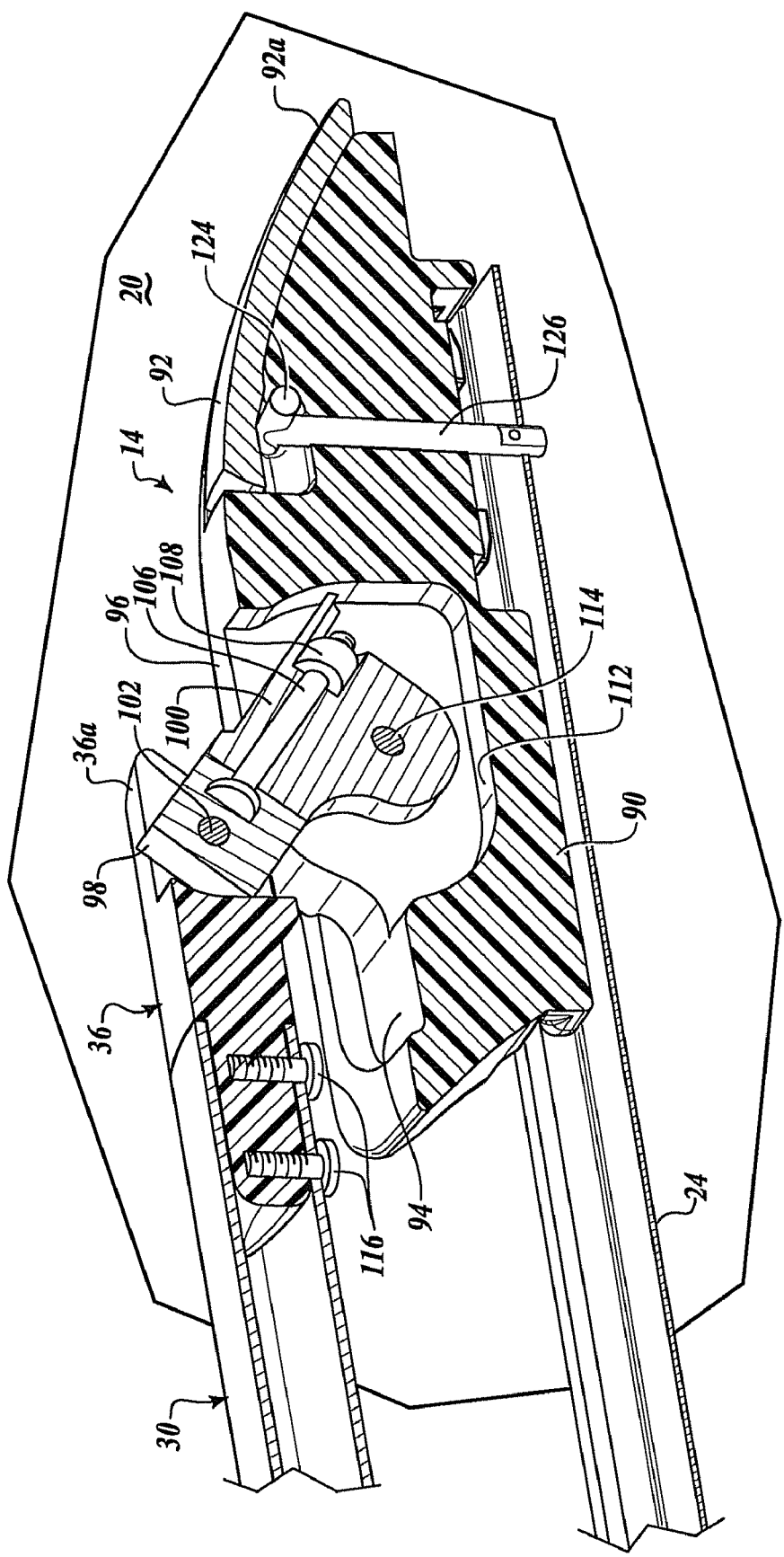
FIG. 14 is a side cross sectional view of the assembly of FIG. 11 showing the second cross bar initially being lifted into an elevated position prior to pivoting the second cross bar.
Figure 15:
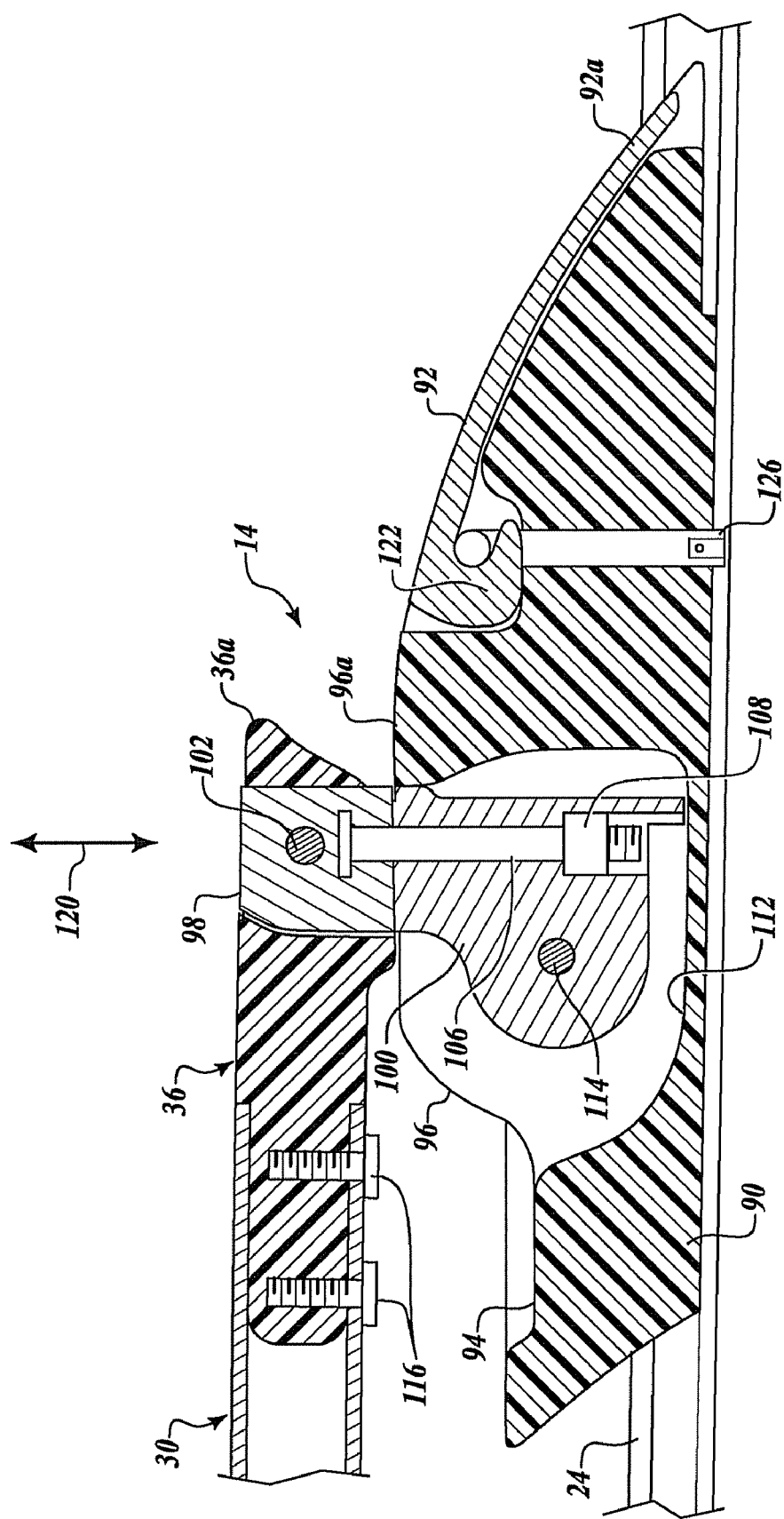
FIG. 15 shows the assembly of FIG. 14 fully lifted into its raised position, with pivoting movement of the second cross bar thereafter being possible.

In operation, pivoting of the cross bar 30 from the position shown in FIG. 11 to the position shown in FIG. 12 occurs by the user first lifting upwardly on the cross bar 30 at approximately the location of the fasteners 116 shown in FIG. 11, in accordance with directional arrow 118. This causes a pivoting movement of the pivot block 100 into the position shown in FIG. 14. The opening 104 provides a slight degree of longitudinal play that enables the end support 36 to be separated apart from the coupling member 98 by a few millimeters to facilitate the pivoting movement of the coupling member 98 relative to the end support 36. When the pivot block 100 is pivoted 90 degrees from the position shown in FIG. 11, it assumes the position shown in FIG. 15. At this point, the cross bar 30 can be pivoted about a vertical axis 120 that is coaxially aligned with threaded shaft 106. Pivoting movement about axis 120 is now possible because arm portions 36a of the end support 36 are clear of the pivot block 100. Such a pivoting motion about the coaxial axis of the threaded shaft 106 is not possible when the cross bar 30 is in its lowered position of FIG. 11 because of the interference between the arm portions 36a and end portion 100a of the pivot block 100, as will be apparent from FIG. 10. From the position shown in FIG. 15, the cross bar 30 is free to be pivoted about axis 120 into the position shown in FIG. 12, which places the cross bar 30 generally perpendicular to the track 24. At this point, the locking end portion 42 can be coupled to support foot 18 to secure the cross bar 30 in its operative position. The pivot block 100 and coupling member 98 thus enable pivoting motion about two perpendicular axes, one essentially defined by the coaxial axis of the threaded shaft 106, and the other defined by the coaxial axis of the pivot pin 114.

With further reference to FIGS. 11 and 12, the actuating lever 92 can be seen in greater detail. The actuating lever 92 includes a clevis portion 122 that accepts a T-shaped head portion 124 of a securing element 126 (also shown in FIG. 11A). The securing element 126 engages a curved retaining leaf spring 128 that rests within the track 24. Lifting of the actuating lever 92 at end portion 92a thereof causes a "flattening" of the leaf spring 128 which releases the support foot 14 from its associated track 24, and thus enables the entire support foot 14 to be moved slidably along the track 24 to a new position. Lowering the actuating lever 92 into the position shown in FIG. 11 allows the leaf spring 128 to assume its resting shape, thus engaging within the walls of the track 24 to hold the support foot 14 securely at the new position. This locking construction is disclosed in U.S. Pat. No. 5,826,766, issued Oct. 27, 1998, assigned to the assignee of the present application, which is hereby incorporated by reference into the present application. When in the closed position, the actuating lever 92 rests within a recess 130 formed in the housing 96. A circumferential notch 132 at end 92a of the actuating lever 92 enables the user to easily grasp the end 92a with a finger for lifting.

Figure 16:
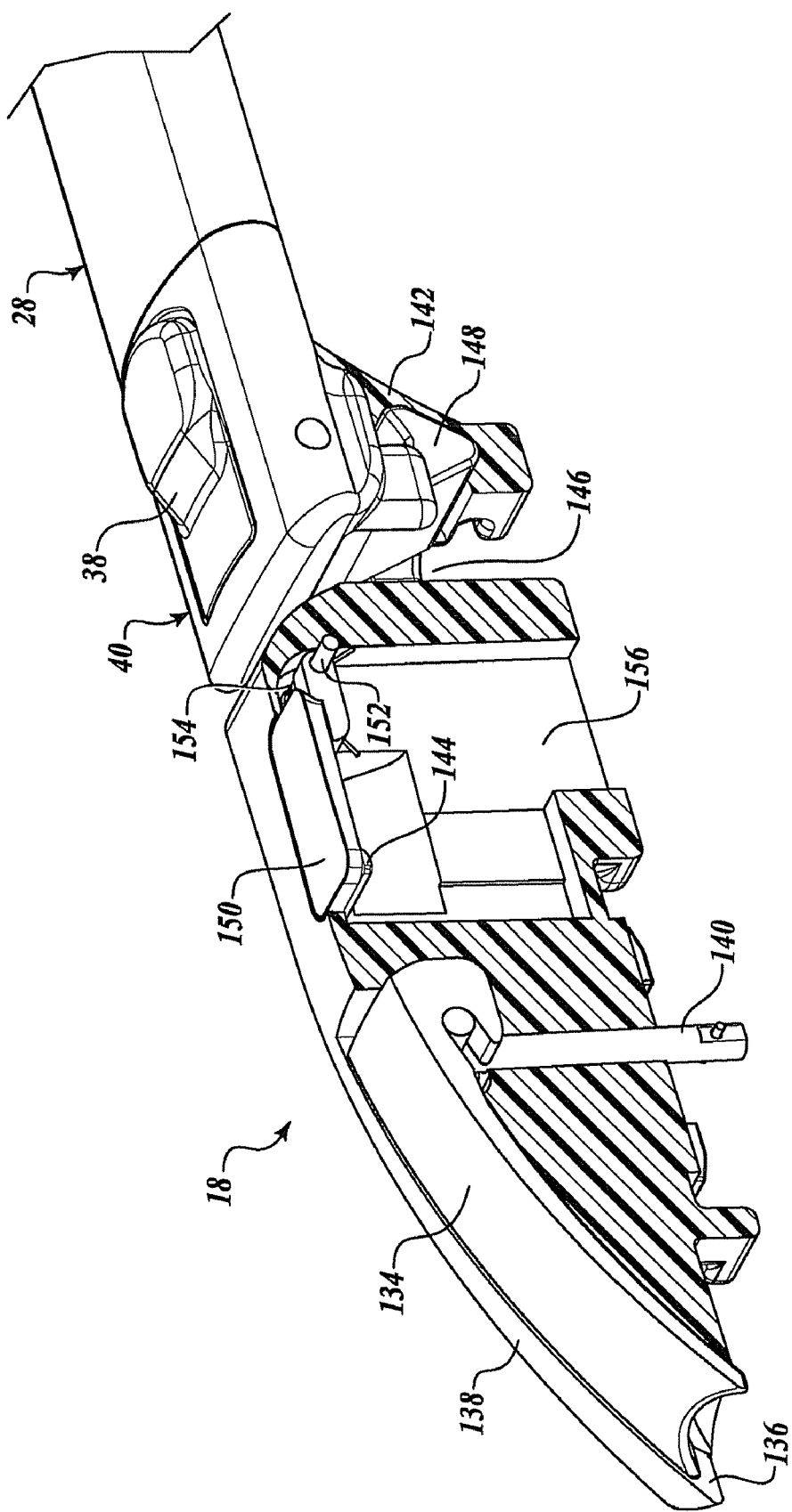
FIG. 16 is a partial cross sectional view of the fourth support foot with an end support of the first cross bar being removably coupled to the fourth support foot.
Figure 17:
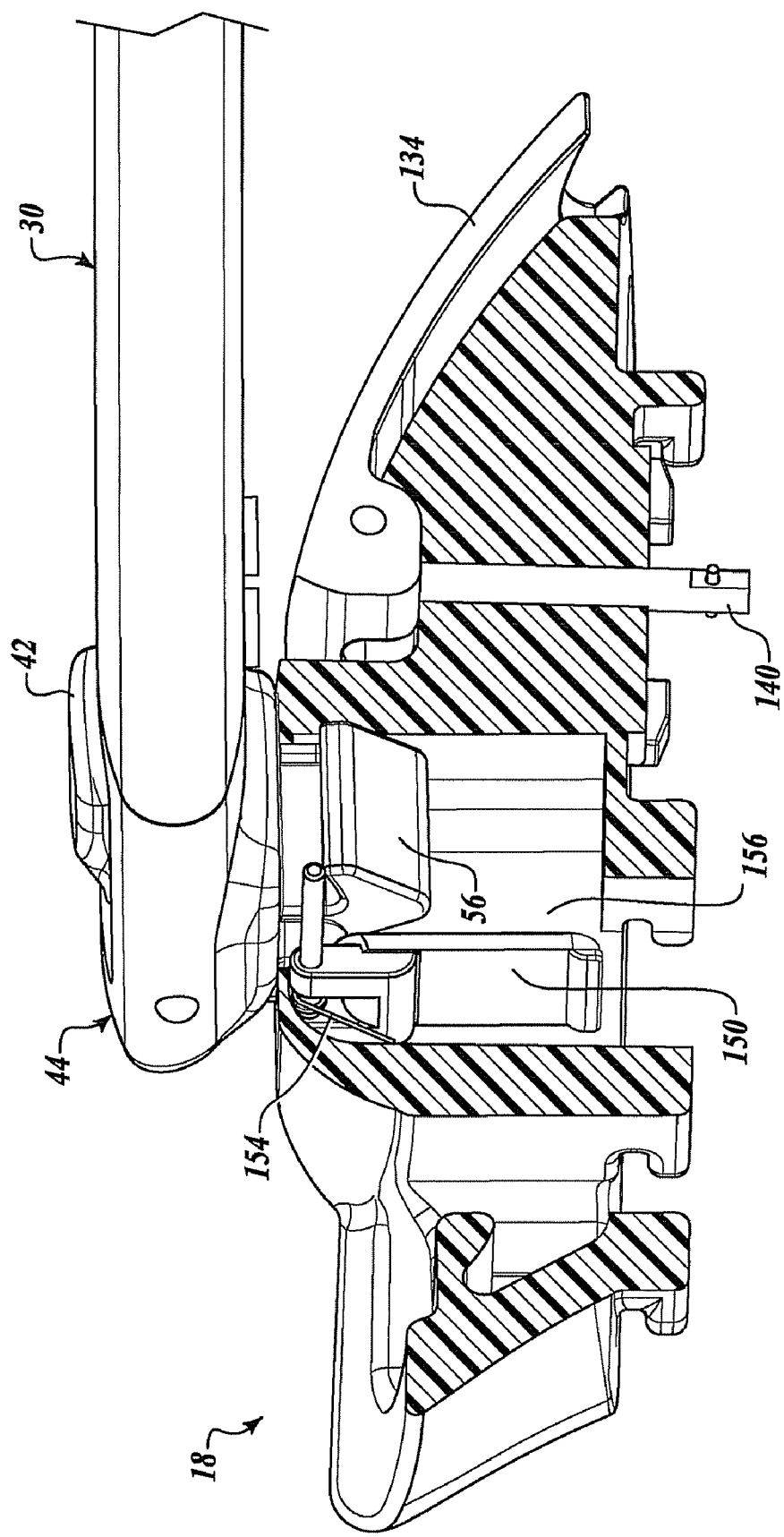
FIG. 17 is a view of the fourth support foot with the end support of the second cross bar removably secured thereto.

Referring now to FIGS. 16 and 17, the construction of the support foot 18 can be seen in greater detail. The construction of the support foot 18 is substantially identical to that of support foot 16 with the exception that support foot 18 includes an actuating lever 134 that is positioned within a recess 136 of a housing portion 138 of the support foot 18. The actuating lever 134 is coupled to a securing element 140 in the same manner as described in connection with actuating lever 92 and securing element 126. To simplify the figure, the locking leaf spring that would ordinarily be secured to the lower end of element 140, in identical fashion to that shown in FIG. 11, is not shown in FIG. 16. Otherwise, the operation of actuating lever 130 is identical to that described in connection with the actuating lever 92 of support foot 14.

The support foot 18 also includes a first cross bar receiving area 142 and a second cross bar receiving area 144. Cross bar receiving area 142 includes a recess 146 designed to accept and retain a locking member 148 associated with locking assembly 38 of end support 40 of cross bar 28. The operation of locking assembly 38 and the construction of end support 40 is identical to the construction of end support 44 and locking mechanism 42 described hereinbefore. Support foot 18 also includes a door 150 that is pivotally mounted about a pivot pin 152, with a torsion spring 154 positioned over the pivot pin 152, in a manner identical to that described in connection with door 72 of support foot 16. When door 150 is depressed, as indicated in FIG. 17, it allows locking mechanism 42 of end support 44 to be secured to the support foot 18 as shown in FIG. 1. The locking member 56 of end support 44 projects into a recessed area 156 as shown in FIG. 17 and is captured within an undercut (not shown) in FIG. 17 that is identical to undercut 84 within support foot 60 as shown in FIG. 8. Thus, support foot 18 also enables the end supports 40 and 44 of the cross bars 28 and 30 to be secured at different, but adjacent, positions on the support foot 18. Advantageously, when the cross bar 30 is secured over the second cross bar receiving area 144, the cross bar 30 is supported in an elevated position relative to the outer body surface 20 to provide additional clearance for the cross bar 30.

The pivot mechanism 29 associated with support foot 12 is identical in construction to the pivot mechanism 34 described herein in association with support foot 14. Support foot 12 does not require the capability to be able to latch an end of cross bar 30 (that function being performed by support foot 16), so the associated structure associated with cross bar receiving area 54 is not required with support foot 12. Both of the support feet 12 and 16 may be fixedly secured via Rivnut® style fasteners or by any other suitable means to the outer body surface 20.

The system 10 thus enables a vehicle article carrier system to be provided that enables a pair of cross bars thereof to be positioned either as side rails extending generally parallel to one another and parallel to a longitudinal axis along the vehicle, or alternatively as cross bars extending perpendicular to the longitudinal axis of the vehicle. The system 10 further enables the cross bars 28 and 30 described herein to be positioned at an elevated position, compared to the position that the cross bars 28 and 30 would assume when they are positioned as side rails. A significant advantage is that the cross bars 28 and 30 do not have to be completely detached from the support feet 12, 14, 16 and 18 when the user wishes to place them in their configuration as side rails. Furthermore, no special tools or disassembly procedures are required to move the cross bars 28 and 30 from their operative to their non-operative positions.

It will also be appreciated that by the use of the term "non-operative", it is merely intended to describe the orientation of the cross bars 28 and 30 as being parallel to one another and parallel to the longitudinal axis of the vehicle 22.

In this position, the cross bars 28 and 30 still can be used to support various articles or possibly various accessories such as bicycle racks, canoe/kayak racks, luggage baskets, etc. With such articles and/or accessory supporting products, additional components may be needed to span the distance between the cross bars 28 and 30. Nevertheless, the cross bars 28 and 30 can perform article carrying functions regardless if they are positioned parallel or perpendicular to the longitudinal axis of the vehicle.

Another significant advantage of the system 10 is that when the cross bars 28 and 30 are positioned as side rails, they assume an especially low profile relative to the outer body surface 20. This can help reduce wind noise and provide a highly aesthetically pleasing appearance to the system 10.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. An article carrier apparatus for supporting articles above an outer body surface of a motor vehicle, the article carrier apparatus comprising:
    a first pair of support feet positionable on said outer body surface;
    a second pair of support feet positionable on said outer body surface;
    one of said first pair of support feet including a first pivot mechanism and one of said second pair of support feet including a second pivot mechanism;
    a pair of cross bars coupled via said pivot mechanisms to selected ones of said support feet;
    said cross bars being pivotally moveable via said pivot mechanisms into first positions extending generally parallel to one another, and parallel to a longitudinal axis of said vehicle, so as to be supported at a first elevation;
    said cross bars further being pivotally moveable from said first positions into second positions in which said cross bars extend generally parallel to one another and generally perpendicular to said longitudinal axis of said vehicle, such that said cross bars are supported at a second elevation above said first elevation; and
    wherein each said pivot mechanism includes:
        a pivot member having a pivot pin arranged along a first direction, and pivotally coupled to a respective one of said support feet;
        a shaft coupling an end of a respective one of said cross bars to said pivot member, the shaft being arranged generally perpendicular to the pivot pin to permit a first pivoting movement of said respective one of said cross bars about an axis extending through the shaft only after a free end of said respective one of said cross bars has been lifted through a second pivoting movement to a predetermined position.

2. The article carrier apparatus of claim 1, wherein selected ones of said support feet are supported on tracks, said tracks being supportable on said outer body surface of said vehicle.

3. The article carrier apparatus of claim 1, wherein said cross bars each include a locking system for removably locking end portions thereof to selected ones of said support feet.

4. The article carrier apparatus of claim 1, wherein two selected ones of said support feet are slidably supported to enable adjustable positioning thereof on said outer body surface.

5. An article carrier apparatus for supporting articles above an outer body surface of a motor vehicle, the article carrier apparatus comprising:
    a pair of first support feet being fixedly securable to said outer body surface in spaced apart fashion;
    a pair of second support feet, one of each of said second support feet being being fixedly securable to said outer body surface such that a first one of said first support feet and a first one of said second support feet form a first laterally aligned pair, and a second one of said first support feet and a second one of said second support feet form a second laterally aligned pair that is spaced longitudinally apart from said first laterally aligned pair;
    a first cross bar pivotally secured at a first end to a first one of said first support feet, and being removably securable at a second end thereof to a first one of said second support feet or a second one of said first support feet;
    a second cross bar secured pivotally at a first end thereof to a second one of said second support feet, and removably securable at a second end thereof to said first one of said second support feet or a second one of said first support feet; and
    each one of said cross bars being supported:
        in a first elevational position when configured to extend generally parallel to one another and generally parallel to said longitudinal axis of said vehicle; and
        in a second elevational position when configured to extend generally parallel to one another but generally perpendicular to said longitudinal axis of said vehicle;
        wherein at least one of said first pair of support feet and at least one of said second pair of support feet each include a pivot mechanism, and wherein each said pivot mechanism includes:
            a pivot member having a pivot pin arranged along a first direction, and pivotally coupled to its respective said one support foot;
            a shaft coupling an end of a respective one of said cross bars to said pivot member, the shaft being arranged generally perpendicular to the pivot pin to permit a first pivoting movement of said respective one of said cross bars about an axis extending through the shaft only after a free end of said respective one of said cross bars has been lifted through a second pivoting movement to a predetermined position.

6. The apparatus of claim 5, wherein said second one of said second support feet includes a recess for supporting an end support of said second cross bar when said second cross bar is in said first elevational position.

7. The apparatus of claim 5, wherein said second one of said first support feet includes a first cross bar supporting area where an end of said second cross bar can be latched, when said second cross bar is placed in said first elevational position.

8. The apparatus of claim 5, wherein said first one of said second support feet includes a first cross bar supporting area where said second end of said first cross bar can be secured when said first cross bar is positioned in said second elevational position.

9. The apparatus of claim 5, wherein both of said cross bars can be pivoted between said first and second elevational positions without interference with one another.

10. The apparatus of claim 5, further comprising:
- a pair of tracks that are securable to said outer body surface generally parallel to one another and generally parallel to said longitudinal axis of said vehicle; and
- wherein said pair of tracks support at least one of said pairs of support feet for adjustable positioning thereon.

11. The apparatus of claim 5, wherein said pair of support feet that are supported on said pair of tracks each include a locking assembly for enabling securing thereof to said pair of tracks, to thus prevent longitudinal movement of said support feet along said pair of tracks.

12. The apparatus of claim 10, wherein each one of said pair of tracks is at least partially recess mounted within said outer body surface.

13. The apparatus of claim 5, wherein each of said cross bars includes a manually actuatable locking member to enable detachment and securing to selected ones of said support feet.

14. An article carrier apparatus for supporting articles above an outer body surface of a motor vehicle, the article carrier apparatus comprising:
- a first pair of support feet positionable diagonally on said outer body surface relative to one another;
- a second pair of support feet positionable diagonally on said outer body surface relative to one another;
- one of said first pair of support feet including a first pivot mechanism and one of said second pair of support feet including a second pivot mechanism;
- a pair of cross bars coupled via said pivot mechanisms to selected ones of said support feet;
- each of said cross bars further including a locking mechanism at an end opposite to an end at which its associated said pivot mechanism is coupled to;
- said cross bars being pivotally moveable via said pivot mechanisms into first positions extending generally parallel to one another, and parallel to a longitudinal axis of said vehicle, so as to be supported at a first elevation;
- said cross bars further being pivotally moveable from said first positions into second positions in which said cross bars extend generally parallel to one another and generally perpendicular to said longitudinal axis of said vehicle, such that said cross bars are supported at a second elevation above said first elevation;
- wherein each said pivot mechanism includes:
  - a pivot member having a pivot pin arranged along a first direction, and pivotally coupled to a respective one of support feet; and
  - a shaft coupling an end of a respective one of said cross bars to said pivot member, the shaft being arranged generally perpendicular to the pivot pin to permit a first pivoting movement of said respective one of said cross bars about an axis extending through the shaft only after a free end of said respective one of said cross bars has been lifted through a second pivoting movement to a predetermined position.

15. The apparatus of claim 14, wherein said pivot mechanisms enable said cross bars to each be rotated about two perpendicular axes of rotation to facilitate movement between said first and second positions.

16. The apparatus of claim 14, wherein at least two of said support feet each include:
- a first cross bar receiving area to which an end of said first cross bar can be secured; and
- a second cross bar receiving area to which an end of said second cross bar can be secured.

17. The apparatus of claim 14, wherein at least two of said support feet are slidably supported on tracks, said tracks being securable to said outer body surface.

18. The apparatus of claim 17, wherein said at least two support feet each include a locking mechanism for securing said at least two support feet at desired positions along said tracks.

* * * * *